United States Patent
Tabaru

(10) Patent No.: US 8,453,517 B2
(45) Date of Patent: *Jun. 4, 2013

(54) PRESSURE GUIDING TUBE BLOCKAGE DIAGNOSING DEVICE AND BLOCKAGE DIAGNOSING METHOD

(75) Inventor: Tetsuya Tabaru, Tokyo (JP)

(73) Assignee: Azbil Corporation, Tokyo (JP)

( * ) Notice: Subject to any disclaimer, the term of this patent is extended or adjusted under 35 U.S.C. 154(b) by 164 days.

This patent is subject to a terminal disclaimer.

(21) Appl. No.: 12/972,865

(22) Filed: Dec. 20, 2010

(65) Prior Publication Data

US 2011/0146415 A1    Jun. 23, 2011

(30) Foreign Application Priority Data

Dec. 21, 2009  (JP) ................................. 2009-288904

(51) Int. Cl.
G01F 1/34  (2006.01)

(52) U.S. Cl.
USPC ...................................................... 73/861.42

(58) Field of Classification Search
USPC ............. 73/861.22, 861.21, 861.55, 861.357, 73/861.42
See application file for complete search history.

(56) References Cited

U.S. PATENT DOCUMENTS

| | | | | |
|---|---|---|---|---|
| 3,994,166 | A | * | 11/1976 | Dower ......................... 73/861.47 |
| 5,663,509 | A | * | 9/1997 | Lew et al. ................. 73/861.357 |
| 6,571,124 | B1 | | 5/2003 | Storm |
| 6,904,810 | B2 | * | 6/2005 | Oomura et al. ............ 73/861.22 |
| 7,406,387 | B2 | | 7/2008 | Hashizume et al. |
| 7,523,667 | B2 | | 4/2009 | Brown et al. |
| 2007/0079180 | A1 | | 4/2007 | Miyamoto |
| 2011/0232369 | A1 | * | 9/2011 | Tabaru et al. ..................... 73/37 |

FOREIGN PATENT DOCUMENTS

| | | |
|---|---|---|
| CN | 1898535 A | 1/2007 |
| JP | 711473 B2 | 2/1995 |
| JP | 7294356 A | 11/1995 |
| JP | 8-136386 A | 5/1996 |
| JP | 20003194 A | 1/2000 |
| JP | 200055950 A | 2/2000 |
| JP | 2000291337 A | 10/2000 |

(Continued)

OTHER PUBLICATIONS

Korean Office Action issued in Korean Patent Application No. 10-2010-0088068 dated May 15, 2012.

(Continued)

*Primary Examiner* — Jewel V Thompson
(74) *Attorney, Agent, or Firm* — Troutman Sanders LLP

(57) ABSTRACT

A differential pressure transmitting device detects, through two pressure guiding tubes, a differential pressure that is generated when that which is to be measured, such as a liquid, a slurry, or a gas, that has fluctuation in the pressure thereof, passes through a differential pressure generating mechanism. A pressure guiding tube blockage diagnosing device comprises: a rising/falling frequency detecting portion for segmenting the differential pressure values detected by the differential pressure transmitting device into a plurality of intervals, and for detecting, for each interval, the rising/falling frequency of the fluctuation of the differential pressure; and an evaluating portion for comparing the rising/falling frequency of the fluctuation to a specific threshold value to evaluate the state of blockage of the pressure guiding tubes.

17 Claims, 9 Drawing Sheets

FOREIGN PATENT DOCUMENTS

| | | |
|---|---|---|
| JP | 20025772 A | 1/2002 |
| JP | 2002162307 A | 6/2002 |
| JP | 2003500149 A | 1/2003 |
| JP | 2004-132817 A | 4/2004 |
| JP | 200785933 A | 4/2007 |
| JP | 2007-256231 | 10/2007 |
| JP | 2008-306288 A | 12/2008 |
| JP | 2009-085769 | 4/2009 |
| WO | 00/72751 A1 | 12/2000 |

OTHER PUBLICATIONS

Japanese Office Action, dated Mar. 19, 2013, which issued during the prosecution of Japanese Patent Application No. 2009-288904, which corresponds to the present application.

* cited by examiner

PRESSURE GUIDING TUBE BLOCKAGE DIAGNOSING DEVICE AND BLOCKAGE DIAGNOSING METHOD

CROSS REFERENCE TO RELATED APPLICATIONS

The present application claims priority under 35 U.S.C. §119 to Japanese Patent Application No. 2009-288904, filed Dec. 21, 2009, which is incorporated herein by reference.

FIELD OF TECHNOLOGY

The present invention relates to a differential pressure measuring device for detecting, through two pressure guiding tubes, a differential pressure that is produced when a liquid, slurry, gas, or the like, to be measured, which has fluctuations in pressure, passes through a differential pressure generating mechanism, such as an orifice, and, in particular, relates to a blockage diagnosing device and blockage diagnosing method for diagnosing a state of blockage of a pressure guiding tube.

BACKGROUND OF THE INVENTION

Conventionally, in the field of process industries, pressure transmitting devices have been used for controlling processes by detecting the variable quantities in processes. The pressure transmitting device is known as a pressure transmitter. The pressure transmitting device is able to measure variable quantities in processes, such as pressure, flow rate, fluid level, specific gravity, and the like, through measurements of differences in pressures between two points or through measurements of absolute pressures. When a variable quantity in a process is measured using a pressure transmitting device, typically that which is to be measured is introduced into the pressure transmitting device through narrow ducts, known as pressure guiding tubes, from both sides of a differential pressure generating mechanism, such as an orifice that is disposed in the process ducting in which flows the liquid, or the like, that is to be measured.

Sometimes, in such a device structure, a solid substance, or the like, becomes adhered to the interior of the pressure guiding tube by that which is to be measured, blocking the pressure guiding tube. Because it becomes impossible to measure accurately the variable quantities for the process when the pressure guiding tube is completely blocked, this can have an extremely large impact on the plant. However, because the pressure is communicated to the pressure transmitting device up until the point when the pressure guiding tube becomes completely blocked, the influence of the blockage does not readily manifest itself in the measured values of the variable quantities in the process. In relation to this process, a remote sealed pressure transmitting device has been created wherein the pressure guiding tubes are not required. However, there is an extremely high number of plants that measure variable quantities of processes using pressure guiding tubes, and thus there are calls for the creation of an on-line diagnosing function for blockages of the pressure guiding tubes.

The technology disclosed in Japanese Patent 3129121 ("JP '121") is known as a conventional technology for diagnosing a state of blockage of a pressure guiding tube. The technology disclosed in JP '121 is for diagnosing a state of blockage of a pressure guiding tube based on the magnitude of fluctuation of a static pressure and a differential pressure.

The technology disclosed in JP '121, as described above, diagnoses the state of blockage of the pressure guiding tube based on the amplitude of fluctuation of a differential pressure and a static pressure. However, there is a problem in the technology disclosed in JP '121 in that the threshold value that is the criterion for the diagnosis must be adjusted depending on the pressure or the magnitude of the flow rate. The conventional problem areas will be described in detail below.

In a first example of embodiment in JP '121, the diagnosing of a blockage of a pressure guiding tube is performed through detecting increases and decreases in the fluctuation amplitude of a high-pressure-side static pressure and of the fluctuation amplitude of a differential pressure. In the second example of embodiment in JP '121, the diagnosing of the blockage is performed through detecting increases and decreases in the fluctuation amplitude of the low-pressure-side static pressure, in addition to that of the high-pressure-side static pressure and that of the differential pressure. However, the fluctuation amplitudes of the pressure and the differential pressure vary depending on the magnitude of the pressure and of the differential pressure at that time. Moreover, the fact that the fluctuation amplitude will vary depending on the differential pressure means that the fluctuation amplitude varies depending on the flow rate. Consequently, when the first example of embodiment and the second example of embodiment according to JP '121 are applied, it is necessary to adjust, as appropriate, the threshold value for detecting the increases and decreases in the fluctuation amplitudes depending on the pressures and on the differential pressure (the flow rate).

In the third example of embodiment in JP '121, the fluctuation amplitude of the high-pressure-side static pressure, the fluctuation amplitude of the low-pressure-side static pressure, and the fluctuation amplitude of the differential pressure are each calculated, and the diagnosing of the blockage of the pressure guiding tubes is performed based on differences in the individual fluctuation amplitudes. While JP '121 claims the ability to cancel out variations in fluctuation amplitudes due to changes in flow rate, through taking the differences in the fluctuation amplitudes, the canceling effects are limited. For example, the parameter S set forth in JP '121 is the result of subtracting the fluctuation amplitude of the differential pressure from the fluctuation amplitude of the high-pressure-side static pressure. However, the fluctuations in the high-pressure-side static pressure and the fluctuations in the differential pressure are produced through different processes to begin with, and thus vary with some degree of independence. As a result, matching of the scopes of increases or decreases of the fluctuation amplitude of the high-pressure-side static pressure and the fluctuation amplitude of the differential pressure, to enable canceling of the effects of the pressure or differential pressure (flow rate) only occurs in rather limited circumstances, and is limited to cases wherein the change in the fluctuation amplitude due to a change in the flow rate is relatively small.

In a fourth example of embodiment in JP '121, single-sample differences are calculated for the high-pressure-side static pressure, the low-pressure-side static pressure, and the differential pressure, respectively, through sampling the high-pressure-side static pressure, the low-pressure-side static pressure, and the differential pressure, and then the diagnosing of a blockage of the pressure guiding tubes is performed based on a parameter that is obtained through fundamental arithmetic operations on these differences. However, this parameter is also influenced by the pressure and by the differential pressure (the flow rate). The reason why this parameter is influenced by the pressure and the differential pressure (the flow rate) will be explained below.

A single-sample difference in the pressure values can be considered to be an instantaneous value for the pressure fluctuation. As such, it is obvious that a sum or a product of a single-sample difference will be affected by the pressure, or the like. The same is true for differences between single-sample differences, where, for the same reason as in the case in the third example of embodiment in JP '121, the conditions under which the influence of the pressure and the flow rate can be canceled are limited. When it comes to a ratio of single-sample differences, if there is, for example, a relationship wherein the fluctuation on the high-pressure-side static pressure is twice that of the fluctuation of the differential pressure at that time, then it would be possible to cancel the effect of the pressure or differential pressure (flow rate). However, as described for the case of the third example of embodiment of JP '121, the processes by which the fluctuations in the static pressure and by which the fluctuations in the differential pressure are produced are different, enabling them to vary independently, and thus the conditions that satisfy the relationship of the fluctuation of the high-pressure-side static pressure being twice that of the fluctuation of the differential pressure at that time are limited.

As described above, when the technology disclosed in JP '121 is used, the fluctuation amplitudes for the pressures and the fluctuation amplitude of the differential pressure, along with the parameters derived from these fluctuation amplitudes, are affected by the pressure and the differential pressure (the flow rate), and thus it is necessary to adjust appropriately the threshold value depending on the magnitude of the pressure or the flow rate.

The present invention is to resolve the issues set forth above, and thus the object thereof is to provide a pressure guiding tube blockage diagnosing device and blockage diagnosing method able to reduce the need for adjusting the threshold value that is the reference for the diagnosis.

SUMMARY OF THE INVENTION

A pressure guiding tube blockage diagnosing device according to an example includes differential pressure detecting means for detecting, through two pressure guiding tubes, a differential pressure that is produced when that which is to be measured, having a fluctuation in a pressure, passes through a differential pressure generating mechanism; fluctuation speed detecting means for detecting a speed of a fluctuation in the differential pressure, based on a differential pressure value detected by the differential pressure detecting means; and evaluating means for evaluating a state of blockage of a pressure guiding tube based on the speed of fluctuation. Additionally, in a first example of a structure for the pressure guiding tube blockage diagnosing device according to the present invention, the fluctuation speed detecting means are provided with rising/falling frequency detecting means for segmenting a time series of the differential pressure values detected by the differential pressure detecting means into a plurality of intervals and for detecting, for each interval, the rising/falling frequency of the fluctuation of the differential pressure, or data corresponding to the rising/falling movement frequency, as information indicating the speed of the fluctuation, where the evaluating means are provided with comparing means for evaluating the state of blockage of the pressure guiding tubes through comparing, to a specific threshold value, the rising/falling frequency of the fluctuation or data corresponding to the rising/falling frequency.

Additionally, in the example of a structure of the pressure guiding tube blockage diagnosing device according to the present invention, the rising/falling frequency detecting means are provided with: reference value calculating means for calculating, for each interval, a reference value for the differential pressure detected by the differential pressure detecting means; and crossing frequency counting means for counting, as the rising/falling frequency for each interval, the number of times during the applicable detecting interval that the differential pressure crosses the reference value calculated during the immediately preceding interval. Moreover, in the first example of a structure for the pressure guiding tube blockage diagnosing device according to the present invention, the rising/falling frequency detecting means has reference value calculating means for calculating, for each interval, a reference value for the differential pressure detected by the differential pressure detecting means; and crossing frequency detecting means for counting, as the rising/falling frequency for each interval, the number of times during the applicable detecting interval that the differential pressure value crosses the reference value calculated during that same interval. Moreover, in the example of a structure of the pressure guiding tube blockage diagnosing device according to the present invention, the reference value is an average value or a central value for the differential pressure values.

In the example of a structure for the pressure guiding tube blockage diagnosing device according to the present invention, the rising/falling frequency detecting means are provided with: difference value detecting means for detecting a difference value between the differential pressure value detected by the differential pressure detecting means and a differential pressure value of a specific time interval earlier; and crossing frequency detecting means for counting, as the rising/falling frequency for each interval, the number of times during the applicable detecting interval that the difference value crosses zero. Furthermore, in the example of a structure for the pressure guiding tube blockage diagnosing device, the rising/falling frequency detecting means are provided with maximum value/minimum value detecting means for counting, as the rising/falling frequency of each interval, the number of maximum values and minimum values of the differential pressure values detected by the differential pressure detecting means. Furthermore, in the example of a structure for the pressure guiding tube blockage diagnosing device according to the present invention, the rising/falling frequency detecting means are provided with: moving average value calculating means for calculating a moving average value of the differential pressure values detected by the differential pressure detecting means; and crossing frequency detecting means for counting, as the rising/falling frequency for each interval, the number of times during the applicable detecting interval that the differential pressure value crosses the moving average value.

Additionally, in the example of a structure for the pressure guiding tube blockage diagnosing device according to the present invention, the rising/falling frequency detecting means are provided with: rate-of-change limit processing means for performing a rate-of-change limit process on the differential pressure value detected by the differential pressure detecting means; second-order delay processing means for performing second-order delay processing on the differential pressure values after the rate-of-change limit processing; and crossing frequency detecting means for counting, as the rising/falling frequency during each interval, the number of times during the applicable detecting interval that the differential pressure value crosses the output value of the second-order delay processing means. Furthermore, in the first example of a structure for the pressure guiding tube blockage diagnosing device according to the present invention, the rising/falling frequency detecting means are provided with: trend line calculating means for calculating, for each interval, a trend line for the differential pressure values detected by the differential pressure detecting means; and crossing frequency detecting means for counting, as the rising/falling frequency for each interval, the number of times during the applicable detecting interval that the differential pressure value crosses the trend line. Moreover, in the example of a structure of the pressure guiding tube blockage diagnosing device according to the present invention, the rising/falling frequency detecting means are provided with: reference value deriving means for using, as the reference value in each interval, the first differential pressure value for each interval; and crossing frequency detecting means for counting, as the rising/falling frequency for each interval, the number of times in the applicable detecting interval that the differential pressure value crosses the reference value.

Additionally, in the example of a structure for the pressure guiding tube blockage diagnosing device according to the present invention, the comparing means evaluate that a blockage has occurred in one or both of two pressure guiding tubes when the rising/falling frequency for the fluctuation continuously falls below a threshold value that is the smaller of two aforementioned threshold values, and evaluates that a blockage has occurred in one of the two pressure guiding tubes when the rising/falling frequency of the fluctuation is continuously above the larger of the threshold values. Additionally, in the example of a structure of a pressure guiding tube blockage diagnosing device according to the present invention, the evaluating means are further provided with ratio calculating means for calculating, for each individual interval, the ratio of the rising/falling frequency of the fluctuation divided by the number of samples in the interval, wherein the comparing means, rather than comparing the rising/falling frequency of the fluctuation to the threshold value, compare the ratio to the threshold value, and evaluate that a blockage has occurred in at least one of the two pressure guiding tubes if the ratio is continuously below the smaller threshold value of the two threshold values, and evaluates that a blockage has occurred in one of the two pressure guiding tubes if the ratio is continuously above the larger of the threshold values. Furthermore, in the example of structure of a pressure guiding tube blockage diagnosing device according to the present invention, the rising/falling frequency detecting means are provided with time interval detecting means for detecting, as information corresponding to the rising/falling frequency for each interval, the time interval between the maximum value and the minimum value of the differential pressure values detected by the differential pressure detecting means. Furthermore, in the example of a structure for a pressure guiding tube blockage diagnosing device, the comparing means evaluate that a blockage has occurred in at least one of the two pressure guiding tubes when the time intervals are continuously greater than the larger threshold value of the two threshold values, and evaluates that a blockage has occurred in one of the two pressure guiding tubes when the time intervals are continuously less than the smaller threshold value.

Additionally, a pressure guiding tube blockage diagnosing method according to the present invention includes a differential pressure detecting step for detecting, through two pressure guiding tubes, a differential pressure that is produced when that which is to be measured, having a fluctuation in a pressure, passes through a differential pressure generating mechanism; a fluctuation speed detecting step for detecting a speed of a fluctuation in the pressure, based on a differential pressure value detected by the differential pressure detecting step; and an evaluating step for evaluating a state of blockage of a pressure guiding tube based on the speed of fluctuation. Additionally, in an example of a structure for the pressure guiding tube blockage diagnosing method according to the present invention, the fluctuation speed detecting step is provided with a rising/falling frequency detecting step for segmenting a time series of the differential pressure values detected by the differential pressure detecting step into a plurality of intervals and for detecting, for each interval, the rising/falling frequency of the fluctuation of the differential pressure, or data corresponding to the rising/falling movement frequency, as information indicating the speed of the fluctuation, where the evaluating step is provided with a comparing step for evaluating the state of blockage of the pressure guiding tubes through comparing, to a specific threshold value, the rising/falling frequency of the fluctuation or data corresponding to the rising/falling frequency.

Given the present invention, it is possible to reduce the need for changing threshold values that serve as diagnostic references, by eliminating the need to make fine adjustments, through detecting the speed of fluctuation in a differential pressure and evaluating the state of blockage of the pressure guiding tubes based on the speed of fluctuation of the differential pressure.

DETAILED DESCRIPTION OF THE INVENTION

Figure 1:
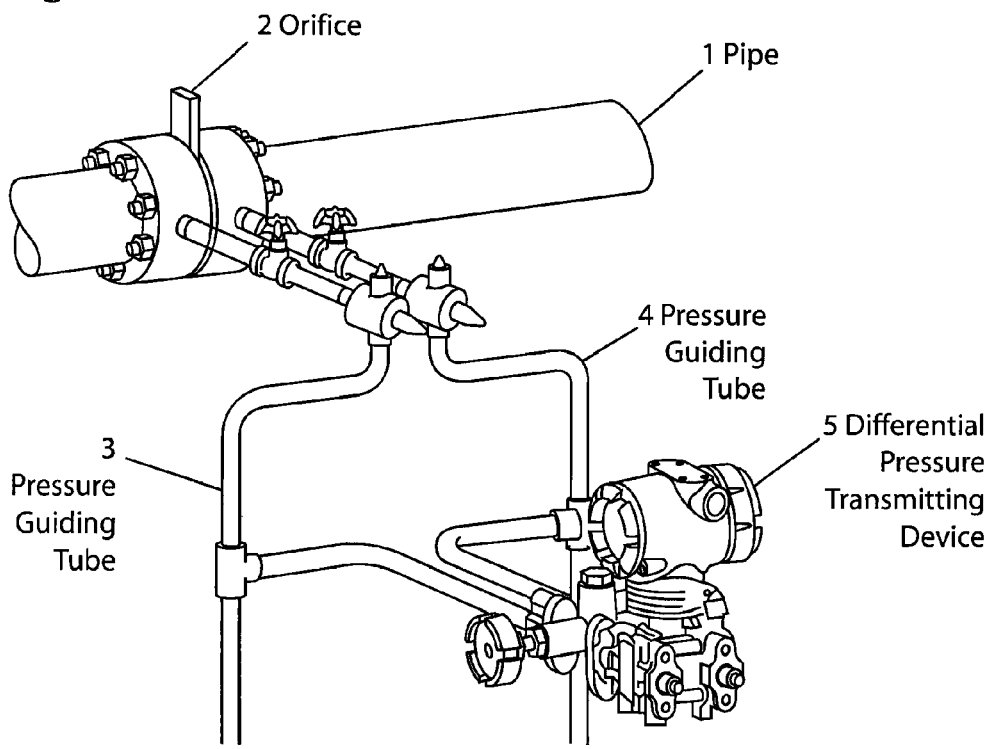
FIG. 1 is an perspective view illustrating a structure for a differential pressure measuring device according to an example of the present invention.

Because the phenomena of fluctuations in pressure or differential pressure are oscillatory phenomena, it is possible to detect information corresponding to the amplitude and frequency of the fluctuations. The technology disclosed in JP '121 is based conceptually on the amplitude of the fluctuations. As a result of investigations into the phenomenon of blockages in the pressure guiding tubes, the inventors focused on the concept of the ability to diagnose a state of blockage of a pressure guiding tube through a method of detecting the frequency of fluctuation (the speed of fluctuation of a pressure or a static pressure), and realized that a method wherein the rising/falling frequency of fluctuations within a constant interval is counted can be used as a method for detecting easily information corresponding to the speed of fluctuation. It is desirable, when counting the rising/falling frequency of fluctuation in a constant interval, that the noise of a frequency that is higher than the primary component of the pressure fluctuation be eliminated. Note that this principle is disclosed in Japanese Patent Application 2008-306288 ("JP '288").

When diagnosing a state of blockage of a pressure guiding tube by detecting the amplitude of a pressure or differential pressure fluctuation as in the technology disclosed in JP '121, the state of the amplitude of the fluctuation changes in connection with the ranges of variation in the pressure value and the differential pressure value themselves, and thus it is necessary to adjust appropriately, in accordance with these variations, the threshold values that serve as the references for the diagnosis. On the other hand, when, as proposed in JP '288, the state of blockage of a pressure guiding tube is diagnosed through detecting the rising/falling frequency of a pressure fluctuation, the rising/falling frequency of the fluctuation is coupled to changes in, for example, the viscosity of the fluid that is subject to measurement, where if the pressure guiding tube is operating properly there will be no large change in the rising/falling frequency in so far as there is no change in, for example, the viscosity of that which is measured, and thus the change in state is held to an extremely limited range. Consequently, there is little chance that the same problem as in the technology disclosed in JP '121 will occur. That is, it is possible to reduce the need for adjusting the threshold values in the technology proposed in JP '288.

However, in the present invention it is envisioned that the differential pressure be used in diagnosing the state of blockage of the pressure guiding tubes. When the differential pressure is used, there are cases wherein the rising/falling frequency of the fluctuation of the differential pressure is increased, rather than being decreased, depending on the type of blockage of the two pressure guiding tubes. Because it is necessary to detect even such a case as being a blockage, an approach that is different from that of the technology proposed in JP '288 is required.

The fluctuation in differential pressure detected through the two pressure guiding tubes is a difference in two pressure fluctuations detected at the two ends of a differential pressure generating mechanisms such as an orifice. Given this, in the proper state wherein there is no blockage of a pressure guiding tube, the pressure fluctuations at the two ends of the differential pressure generating mechanism is communicated as-is to the detecting end through the pressure guiding tubes. Because of this, even in regards to the rising/falling frequency of the fluctuation of the differential pressure, there is no large change coupled to the pressure value or differential pressure value, and thus it can be anticipated that the state of change is held in a limited range, in the same manner as in the case for the rising/falling frequency of the pressure fluctuation when operating normally. This makes it possible to reduce the need for adjusting the threshold value.

However, the differential pressure fluctuation when there is a blockage of a pressure guiding tube exhibits somewhat more complex behavior when compared to the fluctuation of a pressure detected through a single pressure guiding tube. The reason for this is that, due to the fact that there are two pressure guiding tubes in the differential pressure measurements, there will be a plurality of failure modes, a mode wherein there is a blockage of only a single pressure guiding tube, and a mode wherein there are blockages of both pressure guiding tubes. Furthermore, the differential pressure fluctuations are affected by the degree of blockages of the two pressure guiding tubes. Because of this, the approach to the case wherein differential pressure is used must be different from that of the technology proposed in JP '288. The reasons why there are changes in the rising/falling frequencies of the differential pressure fluctuations when pressure guiding tubes are blocked will be explained below.

Figure 16:
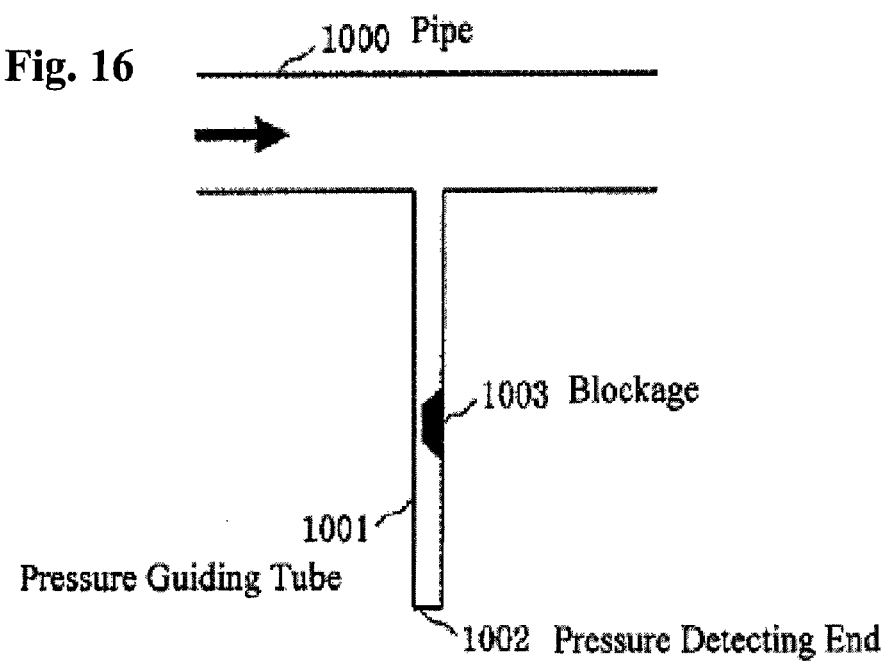
FIG. 16 is a diagram for explaining the changes in the rising/falling frequencies of the pressure fluctuations due to blockages in the pressure guiding tubes.

How the pressure fluctuation changes depending on a blockage of a pressure guiding tube is explained first. As illustrated in FIG. 16, let us consider a case wherein a fluid is guided from a pipe 1000, wherein it is flowing, by a single pressure guiding tube 1001, with the pressure detected by a pressure detecting end 1002 of the pressure guiding tube 1001. The pressure of the fluid within the pipe 1000 undergoes slight increases and decreases irregularly and frequently. If there is no blockage of the pressure guiding tube 1001, then the pressure of the fluid is communicated as-is to the pressure detecting end 1002, so that the pressure at the pressure detecting end 1002 rises and falls in the same way.

Figure 17:
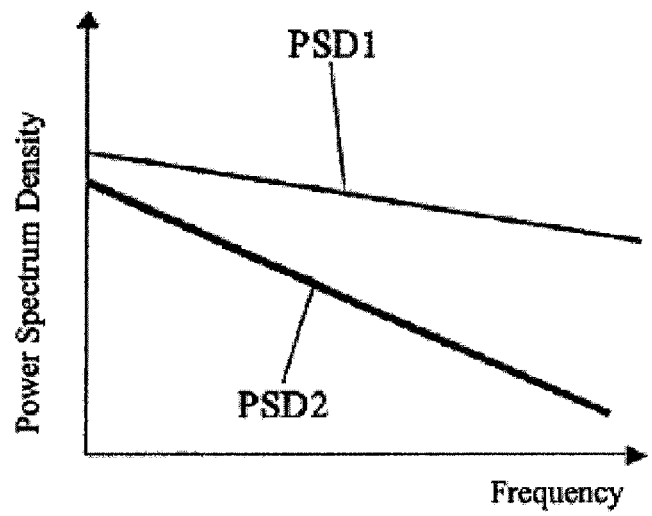
FIG. 17 is a diagram illustrating the pressure fluctuation power spectrum densities.

However, if there is a blockage 1003 of the pressure guiding tube 1001, then the pressure fluctuation of the fluid is not communicated as-is to the pressure detecting end 1002, but rather is communicated with attenuation. Given this, the greater the attenuation in the pressure fluctuation, the greater the frequency. For example, if as illustrated in FIG. 17, the power spectrum density of the pressure fluctuation during proper operation has an intensity such as PSD1, then the power spectrum density of the pressure fluctuation when a blockage 1003 has occurred in the pressure guiding tube 1001 will be as PSD2. As is clear from FIG. 17, although the attenuation of the low-frequency component of the pressure fluctuation is relatively small, the attenuation of the high-frequency components of the pressure fluctuation is large. The result is that in the pressure fluctuation detected by the pressure detecting end 1002, the proportion of all of the fluctuation accounted for by the low-frequency components will be higher than during proper operation. The result is that the speed of the pressure fluctuation is reduced, reducing also the rising/falling frequency.

Figure 18:
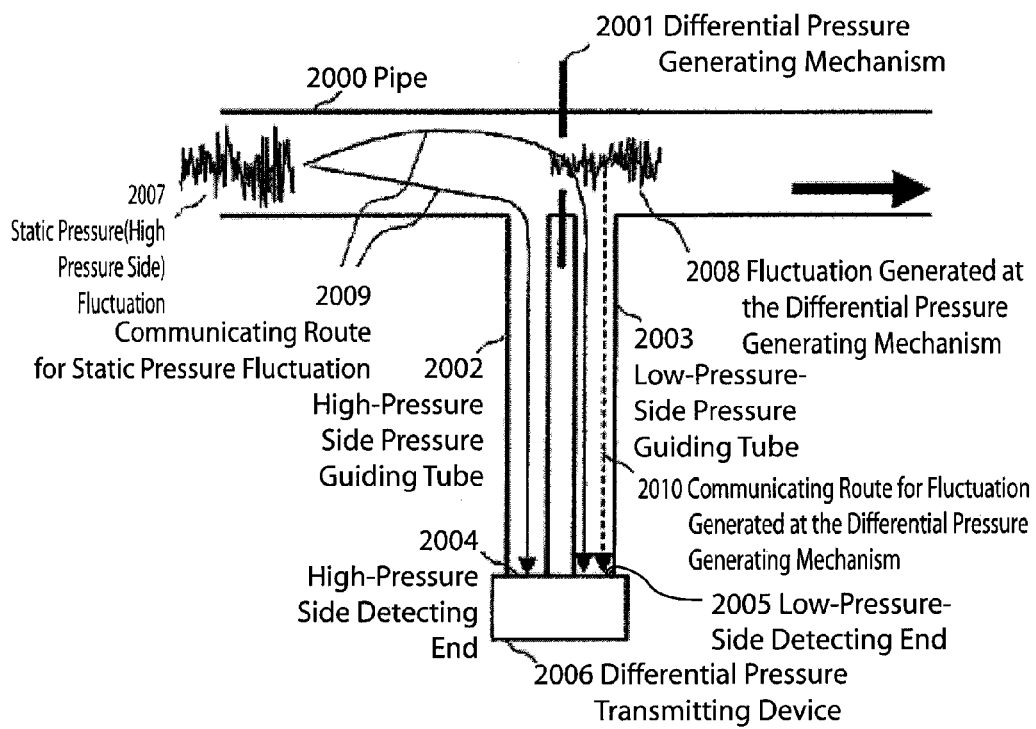
FIG. 18 is a diagram for explaining the differential pressure fluctuation generating mechanisms.

The process by which differential pressure fluctuations are produced is described briefly next. FIG. 18 is a schematic diagram illustrating the process by which the differential pressure fluctuations are produced. In FIG. 18: 2000 is a pipe; 2001 is a differential pressure generating mechanism such as an orifice; 2002 is a high-pressure-side pressure guiding tube; 2003 is a low-pressure-side pressure guiding tube; 2004 is a high-pressure-side detecting end; 2005 is a low-pressure-side detecting end; 2006 is a differential pressure transmitting device; 2007 is a high-pressure-side static pressure fluctuation; 2008 is a fluctuation produced at the differential pressure generating mechanism 2001; 2009 is a static pressure fluctuation communicating route; and 2010 is a communicating route for the fluctuation produced by the differential pressure generating mechanism 2001.

There are primarily two sources that produce differential pressure fluctuations. One of these sources that produce differential pressure fluctuations is the fluctuation of the static pressure on the upstream side (the high-pressure side). When the pressure guiding tubes 2002 and 2003 are both operating properly, the static pressure fluctuations are communicated to both the high-pressure-side detecting end 2004 and the low-pressure-side detecting end 2005. Here the static pressure fluctuations that are communicated to the high-pressure-side detecting end 2004 and the static pressure fluctuations that are communicated to the low-pressure-side detecting end 2005 cancel each other out when the differential pressure is produced by the differential pressure transmitting device 2006. However, the communication routes for the static pressure fluctuations that are communicated to the high-pressure-side detecting end 2004 and for the static pressure fluctuations that are communicated to the low-pressure-side detecting end 2005 are different, and the differential pressure generating mechanism 2001 is included in the communicating route for the static pressure fluctuations that are communicated to the low-pressure-side detecting end 2005, and thus the two static pressures do not completely cancel each other out, leaving some degree of fluctuation.

Another source that produces static pressure fluctuation is the fluctuation that is produced by the differential pressure generating mechanism 2001. While this varies depending on the structure of the differential pressure generating mechanism 2001, because the flow is turbulent when the fluid passes through the differential pressure generating mechanism 2001, irregular pressure fluctuations are produced. These fluctuations are communicated to only the low-pressure-side detecting end 2005. The pressure fluctuations actually detected by the differential pressure transmitting device 2006 will be the sum of the two: the fluctuations arising due to the static pressure fluctuations and the fluctuations arising due to the differential pressure generating mechanism 2001.

Based on the situation set forth above, an investigation was performed regarding the changes in the rising/falling frequency of the differential pressure fluctuation in the differential pressure measurement when there is a failure in a pressure guiding tube. When speaking regarding the high-pressure-side pressure guiding tube and the low-pressure-side pressure guiding tube individually, the difference in the pressure fluctuation when there is a blockage is no different from the case wherein there is a single pressure guiding tube. That is, if there is a blockage of a pressure guiding tube, then becomes more difficult for the high-frequency components of the pressure fluctuation to be communicated, increasing the proportion of the low-frequency components of the pressure fluctuations, thus reducing the rising/falling frequency of the pressure fluctuation measured by the individual detecting end.

However, a differential pressure transmitting device measures the difference in the pressures acting on both detecting ends: the high-pressure-side detecting end and the low-pressure-side detecting end. Moreover, there may be cases wherein only one of the two pressure guiding tubes is blocked. Consequently, the changes when there are blockages are more complex for fluctuations in differential pressure than they are for fluctuations in static pressure. The rising/falling frequency of the differential pressure fluctuation may decrease or may increase when there is a blockage of a pressure guiding tube. This point is a major difference from the case of measuring pressure with a single pressure guiding tube.

As one example, let us consider a blockage of both the high-pressure-side pressure guiding tube and the low-pressure-side pressure guiding tube. In this case, the higher the frequency of a pressure fluctuation, the more difficult it is for the pressure fluctuation to be communicated to both the high-pressure side and the low-pressure side. Consequently, for both the differential pressure fluctuation that arises due to static pressure fluctuation and the differential pressure fluctuation that arises due to the differential pressure generating mechanism, the high-frequency components of both fluctuations are attenuated, increasing the low-frequency component proportion of the fluctuations. Essentially, the differential pressure rising/falling frequency can be reduced because the low-frequency component proportion can be increased for the differential pressure fluctuation that is ultimately measured, that is, for the sum of the fluctuation that arises due to the static pressure fluctuation and the fluctuation that arises due to the differential pressure generating mechanism.

Figure 19:
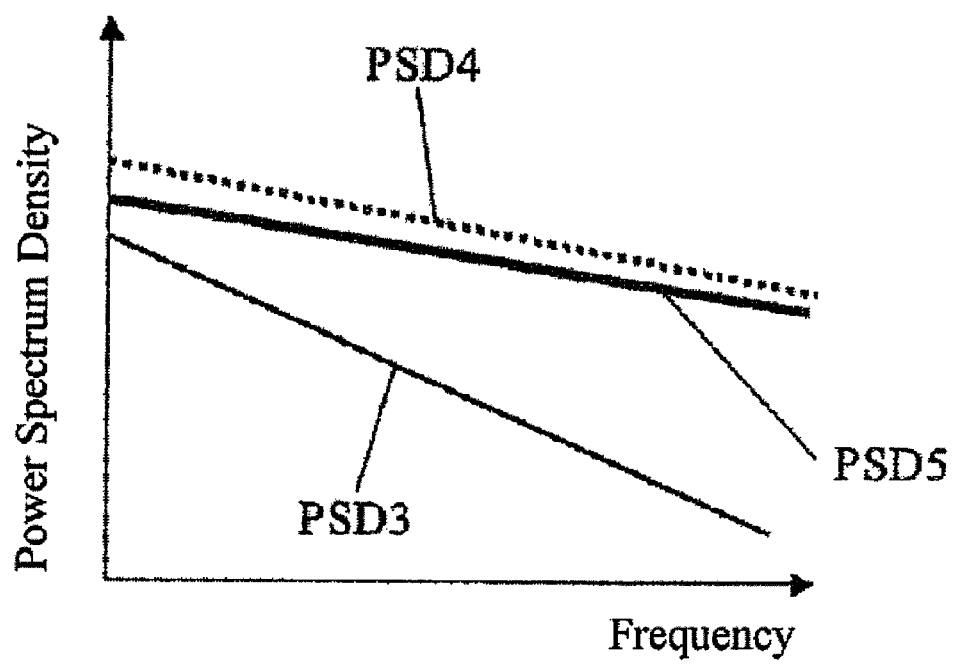
FIG. 19 is a diagram illustrating the differential pressure fluctuation and static pressure fluctuation power spectrum densities.

In another example, let us consider the case wherein, at all frequencies, the static pressure fluctuation on the high-pressure side is large when compared to the differential pressure fluctuation, and there is a blockage of only the low-pressure-side pressure guiding tube. FIG. 19 is a schematic diagram of the power spectrum densities of the differential pressure fluctuation and the static pressure fluctuation in this case, PSD3 shows the power spectrum density of the differential pressure fluctuation at the time that the pressure guiding tubes are operating properly, and PSD4 shows the power spectrum density of the static pressure fluctuation on the high-pressure side when the pressure guiding tubes are operating properly. As described above, the power spectrum density of the static pressure fluctuation on the high-pressure side is larger than the power spectrum density of the differential pressure fluctuation.

When there is a blockage of the low-pressure-side pressure guiding tube alone, the fluctuation that arrives at the low-pressure-side detecting end is attenuated more greatly the higher the frequency of the fluctuation. That is, the high-frequency components of the differential pressure fluctuation detected by the differential pressure transmitting device approaches the magnitude of the high-frequency components of the static pressure fluctuation measured on the high-pressure-side detecting end. On the other hand, for the low-frequency components of the differential pressure fluctuation, the amount of attenuation can be smaller than that for the high-frequency components, even when there is a blockage of the low-pressure-side pressure guiding tube. Because of this, it cannot be said for the low-frequency components of the differential pressure fluctuation that they approach the magnitude of the low-frequency components of the static fluctuation on the high-pressure side, or that they are as conspicuous as the high-frequency components. The result is that when there is a blockage of the low-pressure-side pressure guiding tube alone, the differential pressure fluctuation power spectrum density has a shape that more nearly approaches that of the properly-operating high-pressure-side static pressure fluctuation power spectrum density PSD4 the higher the frequency, as illustrated in PSD5, illustrated in FIG. 19.

When the differential pressure fluctuation power spectrum density PSD5 when the low-pressure-side pressure guiding tube alone is blocked is compared to the differential pressure fluctuation power spectrum density PSD3 at the time of proper operation, the proportion of the fluctuation occupied by the high-frequency component is, conversely, increased. Consequently, the rising/falling frequency of the differential pressure fluctuation is increased beyond what it is during proper operation. This phenomenon of the increased rising/falling frequency can be explained as follows. The differential pressure fluctuation arising from the static pressure fluctuation is the difference between the fluctuation that has arrived at the high-pressure side-detecting end and the fluctuation that has arrived at the low-pressure-side detecting end, and thus, when the pressure guiding tubes are operating properly, the fluctuation that arrives at the high-pressure-side detecting end and the fluctuation that arrives at the low-pressure-side detecting end cancel each other out to some degree, suppressing the power. However, when there is a blockage of the low-pressure-side pressure guiding tube, the cancellation of the fluctuation ceases to occur, increasing the differential pressure fluctuation power beyond what it is during proper operation. Given this, the rate of increase of power due to the blockage of the pressure guiding tube is greater for the high-frequency components, wherein the effect of the attenuation is large. Consequently, this increases the proportion of the entire fluctuation occupied by the high-frequency components, thus increasing the rising/falling frequency of the differential pressure fluctuation. Note that the fluctuation arising due to the differential pressure generating mechanism is relatively small to begin with, and thus does not contribute to the variation in the rising/falling frequency of the differential pressure fluctuation.

As described above, sometimes the rising/falling frequency of the differential fluctuation may increase, and sometimes may decrease, in a differential pressure measurement when a failure occurs wherein there is a blockage of a pressure guiding tube. Consequently, it is possible to diagnose a variety of failures having to do with blockages of pressure guiding tubes by detecting, as failures, both the case wherein the rising/falling frequency of the differential pressure fluctuation is greater than during proper operation and the case wherein the rising/falling frequency of the differential pressure fluctuation is less than it is during proper operation.

An example according to the present invention is explained next. FIG. 1 is a perspective view illustrating the structure of a differential pressure measuring device according to the example. A pipe 1 wherein flows a fluid to be measured, such as a liquid, a slurry, or a gas; 2 is an orifice that is a differential pressure generating mechanism disposed in the pipe 1; 3 and 4 are pressure guiding tubes; and 5 is a differential pressure transmitting device that is the differential pressure detecting means.

The pressure guiding tubes 3 and 4 guide that which is to be measured from two points that are on both sides of the orifice 2 to the differential pressure transmitting device 5. The differential pressure transmitting device 5 measures the differential pressure between the two points in that which is to be measured. The differential pressure transmitting device 5 outputs an electric signal indicating the differential pressure value that has been measured.

Figure 2:
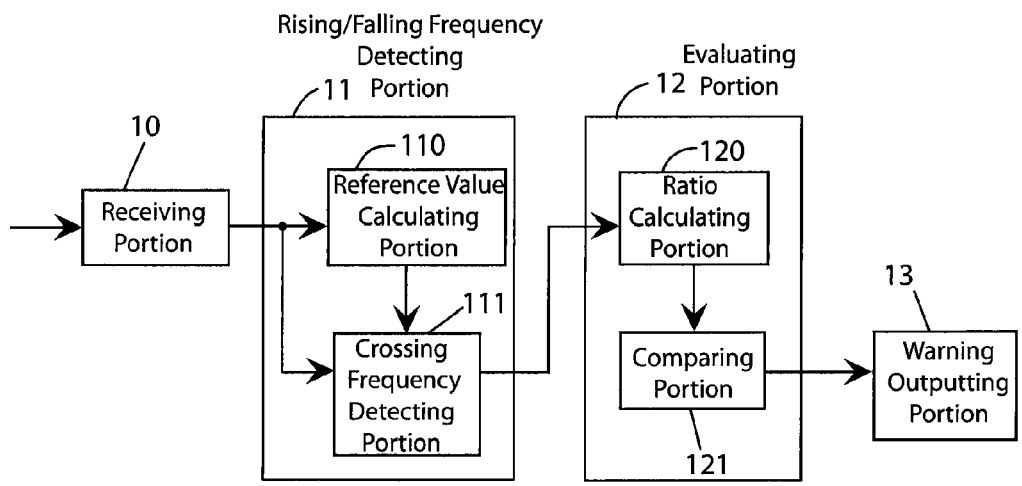
FIG. 2 is a block diagram illustrating the structure of a pressure guiding tube blockage diagnosing device according to the example.

FIG. 2 is a block diagram illustrating the structure of a pressure guiding tube blockage diagnosing device according to the example. The blockage diagnosing device is structured from a receiving portion 10 for receiving a signal outputted from the differential pressure transmitting device 5; a rising/falling frequency detecting portion 11 as fluctuation speed detecting means for detecting the speed of fluctuation of the differential pressure based on the differential pressure values measured by the differential pressure transmitting device 5; an evaluating portion 12 for evaluating the state of blockage of the pressure guiding tubes 3 and 4 based on the rising/falling frequency of the fluctuation; and a warning outputting portion 13 for issuing a warning when there is an evaluation that a blockage has occurred in the pressure guiding tube 3 and/or 4. The rising/falling frequency detecting portion 11 includes a reference value calculating portion 110 and a crossing frequency detecting portion 111. The evaluating portion 12 comprises a ratio calculating portion 120 and a comparing portion 121.

Figure 3:
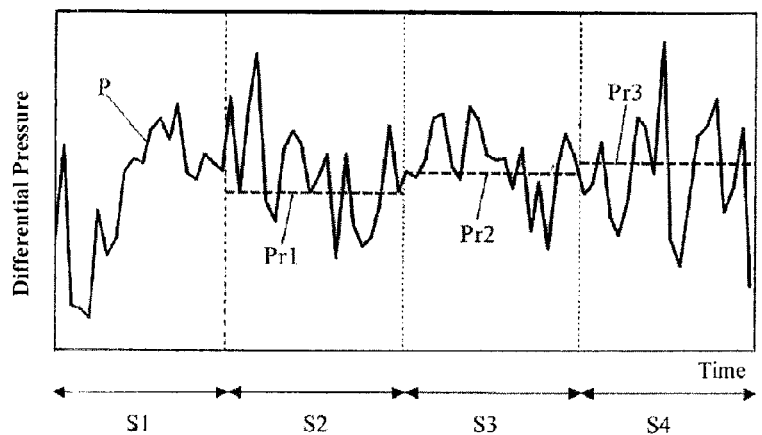
FIG. 3 is a waveform diagram for explaining the operation of the pressure guiding tube blockage diagnosing device according to the example.

The operation of the blockage diagnosing device according to the present example is explained next. FIG. 3 is a waveform diagram for explaining the operation of the blockage diagnosing device according to the example, a diagram illustrating one example of the changes in the differential pressure value P measured by the differential pressure transmitting device 5. Note that while in FIG. 3 the waveform is illustrated as the differential pressure values P being connected, the signal that is actually processed in the example is differential pressure data that are sampled periodically. The receiving portion 10 performs A/D conversion of an analog signal that is outputted from the differential pressure transmitting device 5, to calculate the differential pressure data. Note that, of course, the structure may instead be one wherein the differential pressure transmitting device 5 that outputs differential pressure data from digital output terminals and the receiving portion 10 receives this differential pressure data.

The reference value calculating portion 110 of the rising/falling frequency detecting portion 11, as illustrated in FIG. 3, segments the time series of the differential pressure values P into a plurality of connected continuous S1, S2, S3, S4, . . . , and calculates, for each interval, the reference value Pr of the differential pressure value P. Pr1, Pr2, and Pr3, illustrated in FIG. 3, are the respective reference values calculated in intervals S1, S2, and S3. The intervals may be segmented to have constant time intervals, or may be segmented to have a constant number of samples. Additionally, as reference values, there are the average values and the central values for the applicable reference value calculating intervals.

Following this, the crossing frequency detecting portion 111 of the rising/falling frequency detecting portion 11 counts, for each interval, the number of times that the reference value Pr that was calculated during the immediately previous interval is crossed by the differential pressure value P during the applicable detection interval. That is, if the applicable detection interval is S2, then the number of times that the differential pressure value P in the interval S2 crosses the reference value Pr1, which was calculated during the immediately previous interval S1, is counted. The crossing frequency is the differential pressure fluctuation rising/falling frequency. Following this, the ratio calculating portion 120 of the evaluating portion 12 calculates, for each interval, the ratio of the crossing frequency, counted by the crossing frequency detecting portion 111, divided by the number of samples in the interval, in order to normalize the detecting results by the crossing frequency detecting portion 111.

The comparing portion 121 of the evaluating portion 12 compares the ratio, calculated by the ratio calculating portion 120, to two threshold values that have been established in advance. In the below, the smaller threshold value shall be termed "threshold value A," and the larger threshold value shall be termed "threshold value B." When the ratio is continuously below the threshold value A, the comparing portion 121 determines that a blockage has occurred in the pressure guiding tube 3 and/or the pressure guiding tube 4. Specifically, when the ratio is less than the threshold value A a specific number of times in a row, or if the average value for the ratio for a specific number of intervals is less than the threshold value A, then the comparing portion 121 may determine that a blockage has occurred in the pressure guiding tube 3 and/or the pressure guiding tube 4.

Furthermore, when the ratio is continuously above the threshold value B, the comparing portion 121 determines that a blockage has occurred in the pressure guiding tube 3 or the pressure guiding tube 4. Specifically, when the ratio is greater than the threshold value B a specific number of times in a row, or if the average value for the ratio for a specific number of intervals is greater than the threshold value B, then the comparing portion 121 may determine that a blockage has occurred in the pressure guiding tube 3 or the pressure guiding tube 4.

The warning outputting portion 13 issues a warning when it has been determined that a blockage has occurred in the pressure guiding tube 3 and/or the pressure guiding tube 4. As an example of a warning notification at this time, the notification may be through a buzzer or a sound, or the notification may be through a lamp lighting, or the like.

Figure 4:
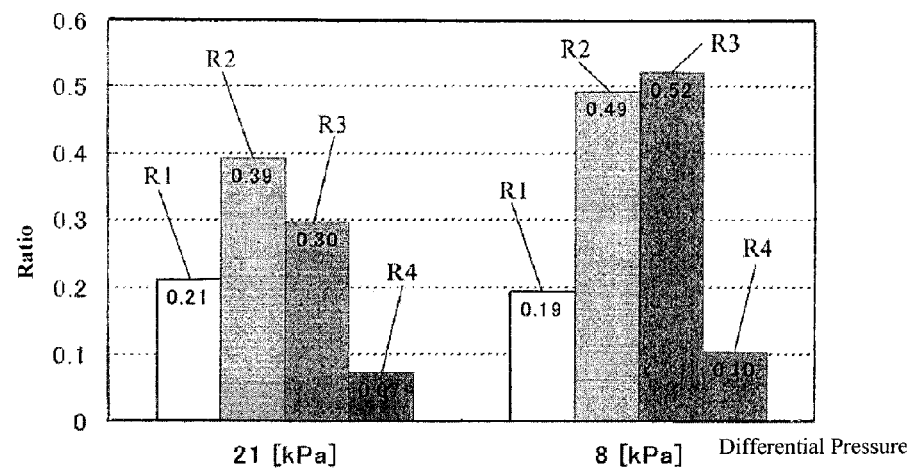
FIG. 4 is a diagram for explaining the effects of the pressure guiding tube blockage diagnosing device according to the example of the present invention.

FIG. 4 is a diagram for explaining the effects of the example, being a diagram illustrating the ratios of the crossing frequencies and the numbers of samples in two pressure states. FIG. 4 is based on data wherein differential pressures have actually been measured by a differential pressure measuring device as illustrated in FIG. 1. In FIG. 4: R1 is the ratio at the time of proper operation; R2 is the ratio at a time wherein there is a blockage of the pressure guiding tube on the upstream side alone; R3 is the ratio wherein there is a blockage of the pressure guiding tube on the downstream side alone; and R4 is the ratio wherein there are blockages of both of the pressure guiding tubes. The differential pressure values 21 kPa and 8 kPa are smoothed values of the differential pressure data from a plurality of intervals. The blockage of the pressure guiding tube was simulated through restricting the opening of a three-way manifold valve attached to the differential pressure transmitting device 3. While this is dependent on the number of samples in the interval, there is variability in the crossing frequency, and so group averages of the crossing frequencies of the multiple intervals were calculated, and ratios were calculated by dividing the average value by a number that is one less than the number of samples in a single interval. These ratios assumed values between 0 and 1.

In FIG. 4 it can be seen that the ratios are different when there is a blockage from when there is proper operation, and there is the difference required for pressure guidance tube blockage diagnostics. In the example in FIG. 4 it can be seen that it is possible to discriminate between the case wherein the pressure guiding tubes are operating properly and the case wherein there is a blockage of a pressure guiding tube if, for example, the threshold value A is set to about 0.15 and the threshold value B is set to about 0.25. Furthermore, it can be seen that the same threshold value may be used both when the differential pressure to be measured is 21 kPa and when the pressure to be measured is 8 kPa.

As described above, in the example, it is possible to diagnose the state of blockage of the pressure guiding tubes based on the rising/falling frequency of the differential pressure fluctuation. In the present example it is possible to reduce the need to adjust the threshold value, by eliminating the need to make line adjustments to the threshold values that are the diagnostic references. Moreover, in the example, the crossing frequency can be counted in real time, and thus this is suited to an on-line implementation for diagnosing the state of blockage of the pressure guiding tubes in a state wherein the process is operating.

Figure 5:
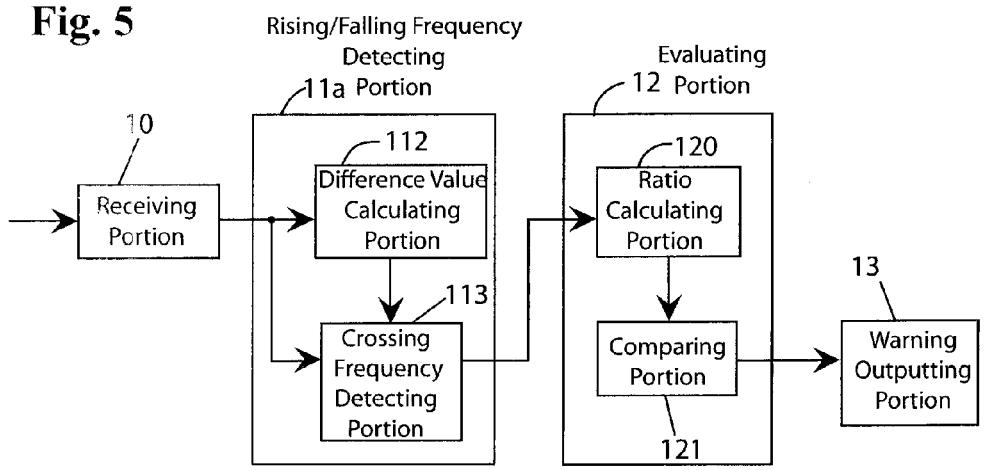
FIG. 5 is a block diagram illustrating the structure of a pressure guiding tube blockage diagnosing device according to another example of the present invention.

Another example according to the present invention is explained next. FIG. 5 is a block diagram illustrating the structure of a pressure guiding tube blockage diagnosing device according to the example, where structures identical to those in FIG. 2 are assigned identical codes. The blockage diagnosing device according to the present example is structured from: a receiving portion 10; a rising/falling frequency detecting portion 11a; an evaluating portion 12; and a warning outputting portion 13. In the present form of embodiment, the frequency of switching between rising and falling in the differential pressure fluctuation is counted as the rising/falling frequency. The rising/falling frequency detecting portion 11a comprises a difference value calculating portion 112 and a crossing frequency detecting portion 113.

The operation of the blockage diagnosing device according to the example is explained next. The difference value calculating portion 112 of the rising/falling frequency detecting portion 11a partitions the time series for the differential pressure values P into a plurality of continuous intervals, and, as illustrated in the following equation, calculates the difference value Pd (t) between the differential pressure value P(t) and the differential pressure value P(t−d) from a specific period of time earlier.

$$Pd(t)=P(t)-P(t-d) \qquad (1)$$

If the sampling period is selected as the specific period of time d, then this is the difference from the sample value that is 1 previous, which is the equivalent of calculating a single-stage difference of differential pressure values. However, there is no need for the specific period of time d to be the sampling period. The difference value calculating portion 112 performs a calculation such as described above for each differential pressure sample value.

The crossing frequency detecting portion 113 of the rising/falling frequency detecting portion 11a counts, for each interval, the number of times the difference value calculated by the difference value calculating portion 112 crosses zero (the number of zero crossings). The number of zero crossings serves as the rising/falling frequency for the fluctuation of the differential pressure. As with the above example, the ratio calculating portion 120 of the evaluating portion 12 calculates, for each interval, a ratio wherein the number of zero crossings, counted by the crossing frequency detecting portion 113, is divided by the number of samples in an interval. The operation of the comparing portion 121 and the warning outputting portion 13 are identical to those above.

The present example enables the same results as in the previous example to be obtained. In the present example, the differential pressure values serve as a high-pass filter process, enabling extraction of only the fluctuations of the differential pressure. Note that the differences of differences of differential pressure values may instead be calculated by the difference value calculating portion 112. In this case, a strong high pass filter is applied by the differential pressure values, enabling the extraction and accentuation of only the fluctuation in the differential pressure.

Figure 6:
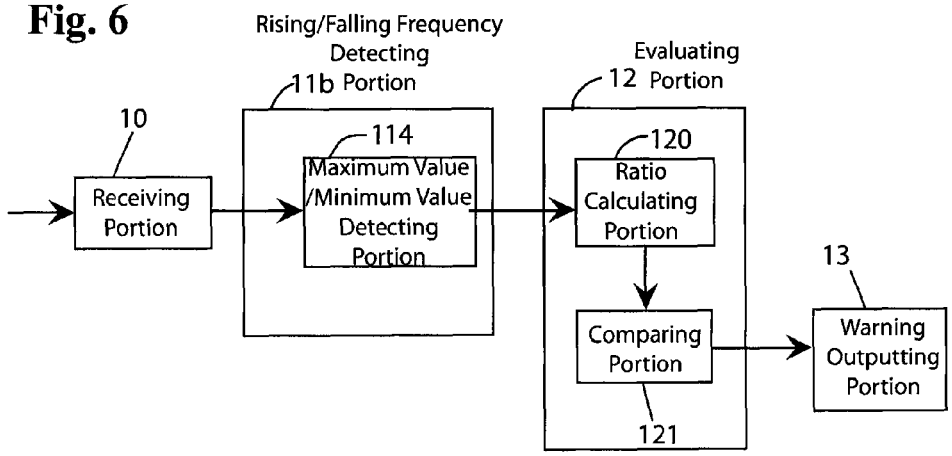
FIG. 6 is a block diagram illustrating the structure of a pressure guiding tube blockage diagnosing device according to a further example of the present invention.

A further example according to the present invention is explained next. FIG. 6 is a block diagram illustrating the structure of a pressure guiding tube blockage diagnosing device according to an above example, where structures identical to those in FIG. 2 are assigned identical codes. The blockage diagnosing device according to the present example is structured from: a receiving portion 10; a rising/falling frequency detecting portion 11*b*; an evaluating portion 12; and a warning outputting portion 13.

The present example is based on the same concept as in the above example, but the number of maximum values and minimum values for the differential pressure is counted as the rising/falling frequency instead of the number of zero crossings of the difference value. The rising/falling frequency detecting portion 11*b* has a maximum value/minimum value detecting portion 114. The maximum value/minimum value detecting portion 114 segments the time series of the differential pressure values P into a plurality of continuous intervals, and counts, for each interval, the number of maximum values and minimum values of the differential pressure value P As with the other examples, the ratio calculating portion 120 of the evaluating portion 12 calculates, for each interval, a ratio wherein the number of maximum values and minimum values, counted by the maximum value/minimum value detecting portion 114, is divided by the number of samples in an interval. The operation of the comparing portion 121 and the warning outputting portion 13 are identical to those above. Identical effects as in the above example can be obtained through the present example as well.

Figure 7:
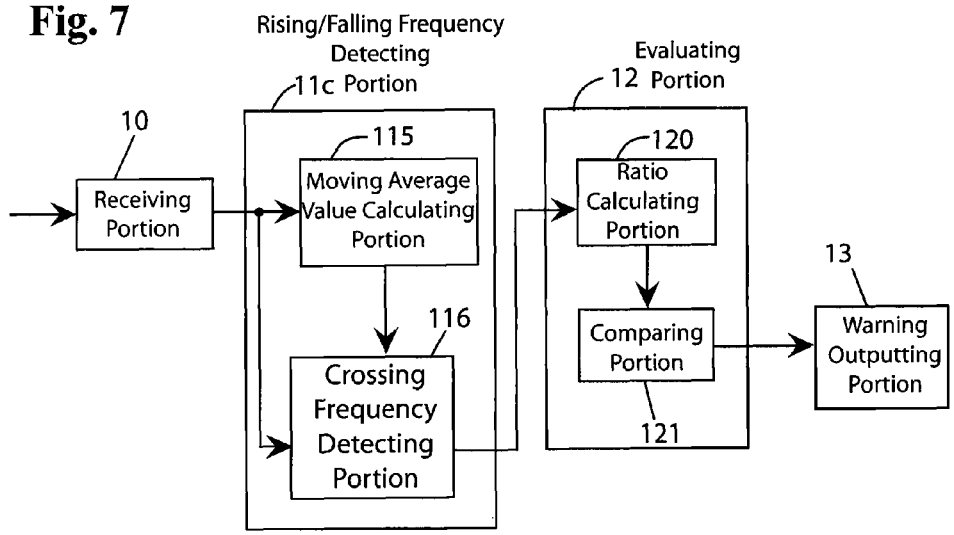
FIG. 7 is a block diagram illustrating the structure of a pressure guiding tube blockage diagnosing device according to an example of the present invention.

A yet another example according to the present invention is explained next. FIG. 7 is a block diagram illustrating the structure of a pressure guiding tube blockage diagnosing device according to the above example, where structures identical to those in FIG. 2 are assigned identical codes. The blockage diagnosing device according to the present example is structured from: a receiving portion 10; a rising/falling frequency detecting portion 11*c*; an evaluating portion 12; and a warning outputting portion 13. The rising/falling frequency detecting portion 11*c* comprises a moving average value calculating portion 115 and a crossing frequency detecting portion 116.

Figure 8:
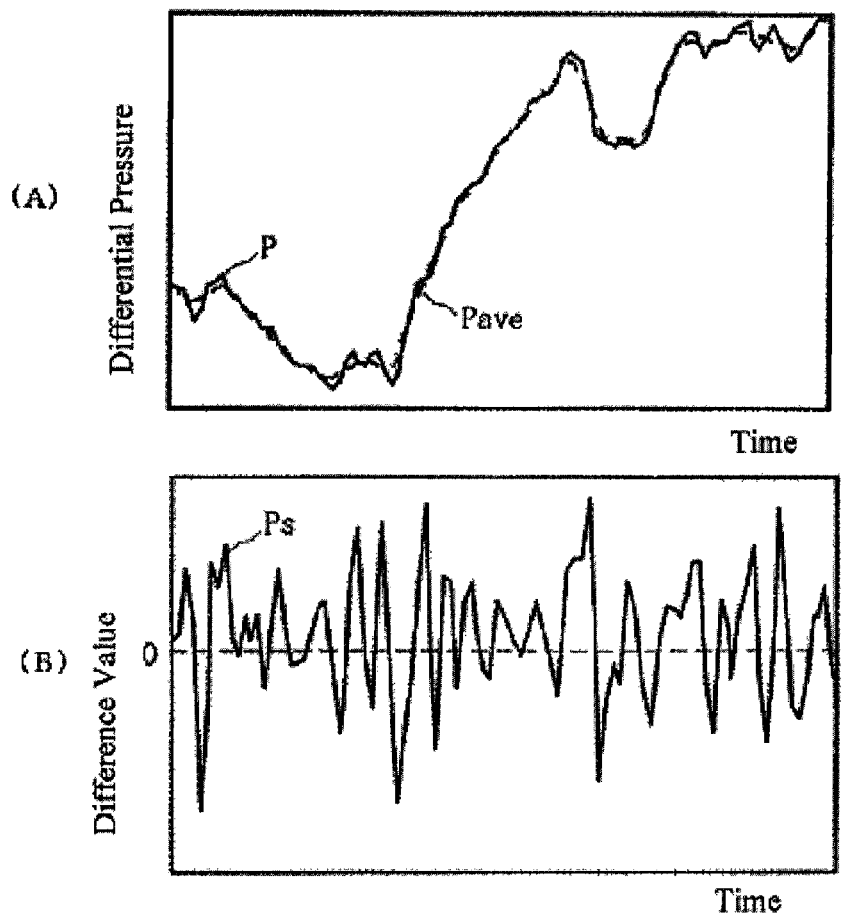
FIG. 8 is a waveform diagram for explaining the operation of a pressure guiding tube blockage diagnosing device according to the example.

FIG. 8 (A) and FIG. 8 (B) are waveform diagrams for explaining the operation of the blockage diagnosing device according to the present example, where FIG. 8 (A) is a diagram illustrating one example of the differential pressure values P measured by the differential pressure transmitting device 5 and the changes in the moving average values Pave thereof, and FIG. 8 (B) is a diagram illustrating the difference values Ps between the differential pressure values P and the moving average values Pave. Note that while in FIG. 8 (A) and FIG. 8 (B), the differential pressure values P, the moving average values Pave, and the difference values Ps are illustrated as continuous waveforms, in the present example the signals that are actually processed are differential pressure data that are sampled periodically, and the moving average values Pave and difference values Ps are also discrete data.

The moving average value calculating portion 115 segments the time series of the differential pressure values P into a plurality of continuous intervals, and calculates the moving average values Pave of the differential pressure values P. A normal moving average value may be used as the moving average value Pave, or, conversely, a weighted moving average value, or an exponentially weighted moving average (EWMA), which is a weighted average value having weightings that attenuate exponentially, calculated recursively, or the like may be used. The moving average value calculating portion 115 performs the moving average value Pave calculation with each sample value of differential pressure.

Following this, the crossing frequency detecting portion 116 counts, for each interval, the number of times that the differential pressure value P crosses the moving average value Pave in the applicable detection interval. Specifically, the crossing frequency detecting portion 116 may calculate the difference values Ps between the differential pressure values P and the moving average values Pave, as illustrated in FIG. 8 (B), to count, for each interval, the number of zero crossings of the difference values Ps. The number of zero crossings serves as the rising/falling frequency of the differential pressure fluctuation.

As with the above example, the ratio calculating portion 120 of the evaluating portion 12 calculates, for each interval, a ratio wherein the number of zero crossings, counted by the crossing frequency detecting portion 116, is divided by the number of samples in an interval. The operation of the comparing portion 121 and the warning outputting portion 13 are identical to those above. Identical effects as in the example can be obtained through the present example as well. Additionally, in the present example, the calculations follow well the fluctuation in the differential pressure values P.

Figure 9:
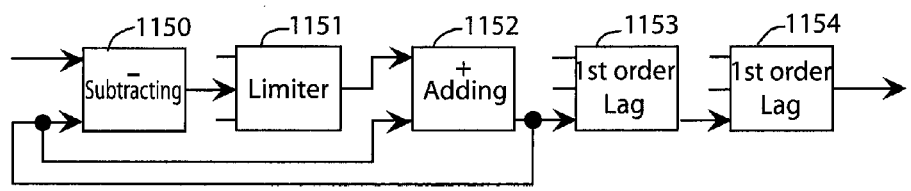
FIG. 9 is a block diagram illustrating an example of structure of a moving average value calculating portion according to yet another example of the present invention.

An even further example according to the present invention is explained next. FIG. 9 is a block diagram illustrating an example of a structure for the moving average value calculating portion 115 illustrated in FIG. 7. The moving average value calculating portion 115 comprises a subtracting portion 1150, a limiter 1151, an adding portion 1152, and first-order delay processing portions 1153 and 1154.

Figure 10:
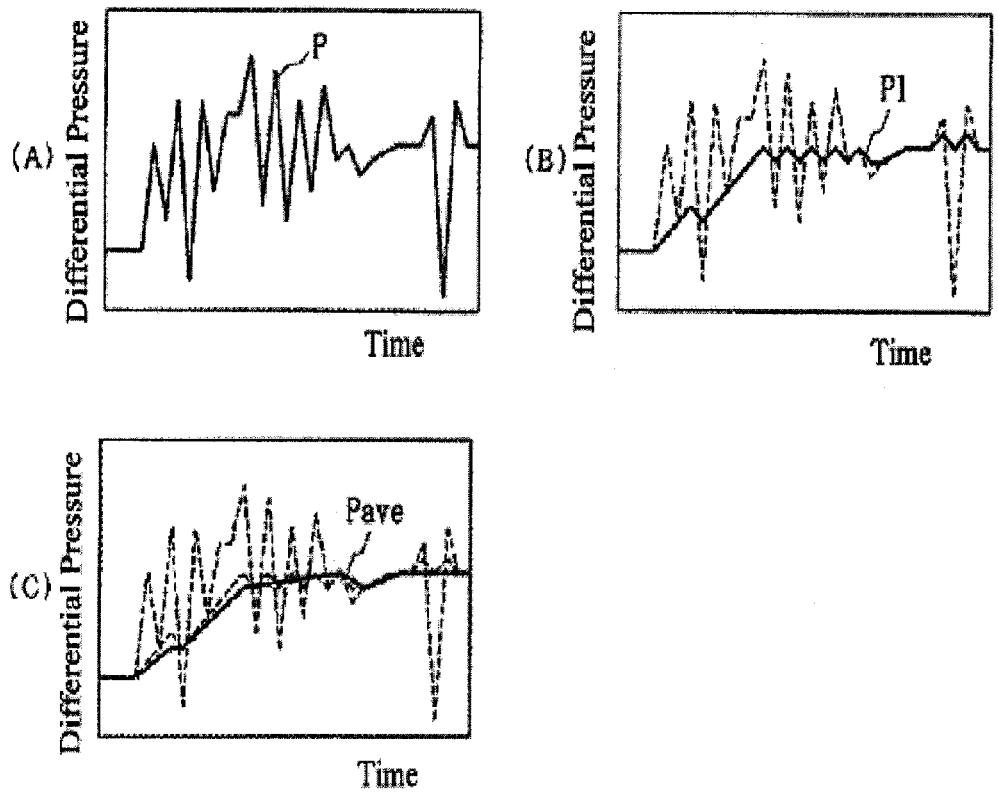
FIG. 10 is a waveform diagram for explaining the operation of a moving average value calculating portion according to the example.

FIG. 10 (A), FIG. 10 (B), and FIG. 10 (C) are waveform diagrams for explaining the operation of the moving average value calculating portion 115 according to the present example, where FIG. 10 (A) is a diagram illustrating one example of the changes in the differential pressure values P measured by the differential pressure transmitting device 5, FIG. 10 (B) is a diagram illustrating the differential pressure values P1 after a change ratio limiting process has been performed on the differential pressure values P, and FIG. 10 (C) is a diagram illustrating the difference values Pave after a second-order delay process has been performed on the differential pressure values P1. Note that while in FIG. 10 (A), FIG. 10 (B), and FIG. 10 (C) the differential pressure values P, P1, and Pave are illustrated as continuous waveforms, in the present example the signals that are actually processed are differential pressure data that are sampled periodically, and differential pressure values P1 and Pave are also discrete data.

The subtracting portion 1150 subtracts, from the differential pressure value P, the immediately previous value from one sampling previous. The limiter 1151 performs a limiting process, limiting the difference value between the differential pressure value P and the immediately previous value. The adding portion 1152 adds the output value from the limiter 1151 to the immediately previous value from one sampling previous. Doing so causes the immediately previous value, from one sample previous, calculated by the adding portion 1152, to be a value wherein a change ratio limiting process has been performed, such as in the differential pressure value P1 illustrated in FIG. 10 (B).

Following this, the first-order delay processing portion 1153 performs a first-order delay process on the differential pressure value P1, and the first-order delay processing portion 1154 performs a first-order delay process on the output value from the first-order delay processing portion 1153. As a result, the value that is outputted from the first-order delay processing portion 1154 is a value which has undergone a second-order delay process, as with the differential pressure value Pave illustrated in FIG. 10 (C).

The present example enables the variation of the low-frequency component that is other than that from the fluctuation phenomenon in the differential pressure to be smoothed, and enables numerical values that are sufficiently close to the moving average value Pave, described in the above example (that is, essentially the average values) to be obtained in essentially real time. Furthermore, it is possible to exclude the influence of the high-frequency signal noise in the differential pressure values P by adjusting the second-order delay time constant. The structures and operations, other than those of the moving average value calculating portion 115, are as described above.

Figure 11:
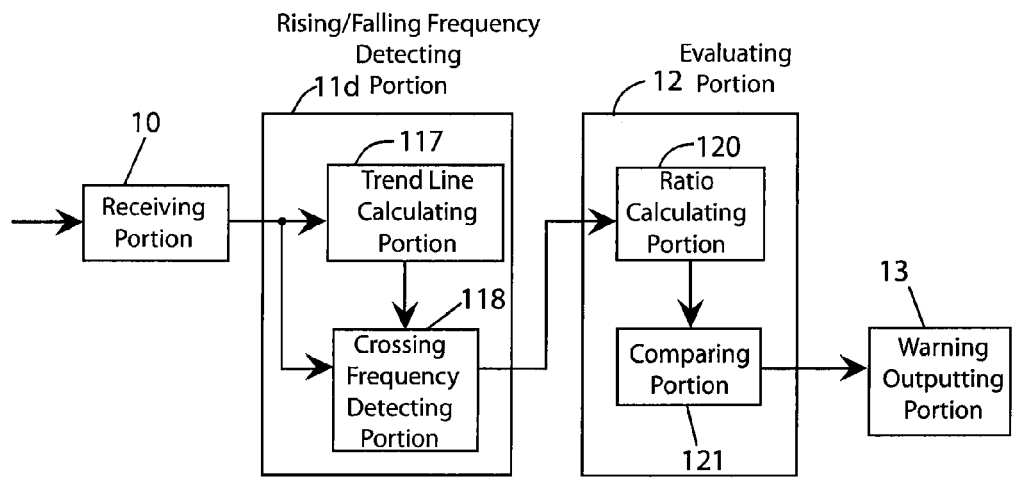
FIG. 11 is a block diagram illustrating the structure of a pressure guiding tube blockage diagnosing device according to a further example of the present invention.

Another example according to the present invention is explained next. FIG. 11 is a block diagram illustrating the structure of a pressure guiding tube blockage diagnosing device according to an example of the present invention, where structures identical to those in FIG. 2 are assigned identical codes. The blockage diagnosing device according to the present example is structured from: a receiving portion 10; a rising/falling frequency detecting portion 11d; an evaluating portion 12; and a warning outputting portion 13. The present example is based on the same concept as in the above example. The rising/falling frequency detecting portion 11d has a trend line calculating portion 117 and a crossing frequency detecting portion 118.

Figure 12:
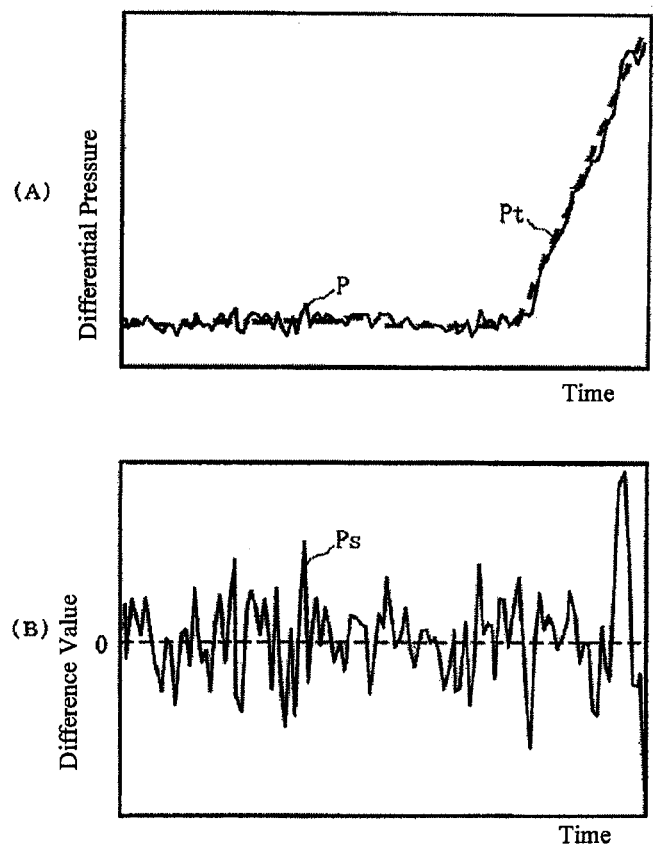
FIG. 12 is a waveform diagram for explaining the operation of a pressure guiding tube blockage diagnosing device according to the example.

FIG. 12 (A) and FIG. 12 (B) are waveform diagrams for explaining the operation of the blockage diagnosing device according to the present example, where FIG. 12 (A) is a diagram illustrating one example of the differential pressure values P measured by the differential pressure transmitting device 5 and the changes in the trend line Pt thereof, and FIG. 12 (B) is a diagram illustrating the difference values Ps between the differential pressure values P and the trend line Pt. Note that while in FIG. 12 (A) and FIG. 12 (B), the differential pressure values P and the difference values Ps are illustrated as continuous waveforms, in the present example the signals that are actually processed are differential pressure data that are sampled periodically and difference values Ps are also discrete data.

The trend line calculating portion 117 segments the time series of the differential pressure values P into a plurality of continuous intervals, and calculates the trend line Pt of the differential pressure values P for each interval. An example of a trend line Pt is, for example, a least-squares approximation line of the time series of the differential pressure values P.

Following this, the crossing frequency detecting portion 118 counts, for each interval, the number of times that the differential pressure value P crosses the trend line Pt in the applicable detection interval. Specifically, the crossing frequency detecting portion 118 may calculate the difference values Ps between the differential pressure values P and the trend line Pt, as illustrated in FIG. 12 (B), to count, for each interval, the number of zero crossings of the difference values Ps. The number of zero crossings serves as the rising/falling, frequency for the fluctuation of the differential pressure.

As with the above examples, the ratio calculating portion 120 of the evaluating portion 12 calculates, for each interval, a ratio wherein the number of zero crossings, counted by the crossing frequency detecting portion 118, is divided by the number of samples in an interval. The operation of the comparing portion 121 and the warning outputting portion 13 are identical to those above. Identical effects as in the above examples can be obtained through the present example as well. Additionally, in the present example, the calculations follow well the fluctuation in the differential pressure values P, but have additional calculating overhead relative to some of the above examples.

While in the examples above the number of times, during the applicable detecting interval, that the differential pressure value P crossed a reference value that was detected during the immediately previous interval for the calculation of the reference value was counted for each interval, instead the applicable interval for detection may be identical to the interval for reference value calculation. That is, the number of times, during the applicable detecting interval, that the differential pressure values P crosses the reference value may be counted after calculating the reference value for the differential pressure value P during the applicable detecting interval. Even in the present example, the structure of the pressure guiding tube blockage diagnosing device is identical to that in the above example, and thus the explanation uses the codes of FIG. 2.

Figure 13:
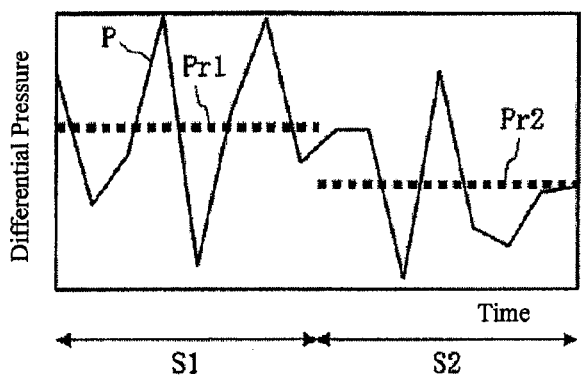
FIG. 13 is a waveform diagram for explaining the operation of a pressure guiding tube blockage diagnosing device according to an even further example of the present invention.

FIG. 13 is a waveform diagram for explaining the operation of the blockage diagnosing device according to the present example, and is a diagram illustrating one example of the changes in the differential pressure values P measured by the differential pressure transmitting device 5. Note that while in the FIG. 13 the differential pressure values P are illustrated as a continuous waveform, the signals actually processed in the present example are differential pressure data sampled periodically.

The reference value calculating portion 110 in the present example segments the time series of the differential pressure values P into a plurality of continuous intervals S1, S2, . . . , and calculates the reference value Pr of the differential pressure values P for each interval. Pr1 and Pr2, illustrated in FIG. 13, are the respective reference values calculated in intervals S1 and S2. As with the other examples, an average value or central value of the differential pressure values P is used as the reference value.

Following this, the crossing frequency detecting portion 111 counts, for each interval, the number of times that the differential pressure value P crosses the reference value Pr, calculated during that interval, in the applicable detection interval. That is, if the applicable detection interval is S2, then the number of times that the differential pressure value P in the interval S2 crosses the reference value Pr2 is counted. The crossing frequency is the differential pressure fluctuation rising/falling frequency. The operation of the evaluating portion 12 and the warning outputting portion 13 are identical to those above.

While the effects of the present example are based on those of the above examples, the reference value is not established, and thus the number of crossings cannot be calculated, until all of the samples for the interval have been taken. Thus, this is not as well suited to an on-line implementation as is the above examples.

Figure 14:
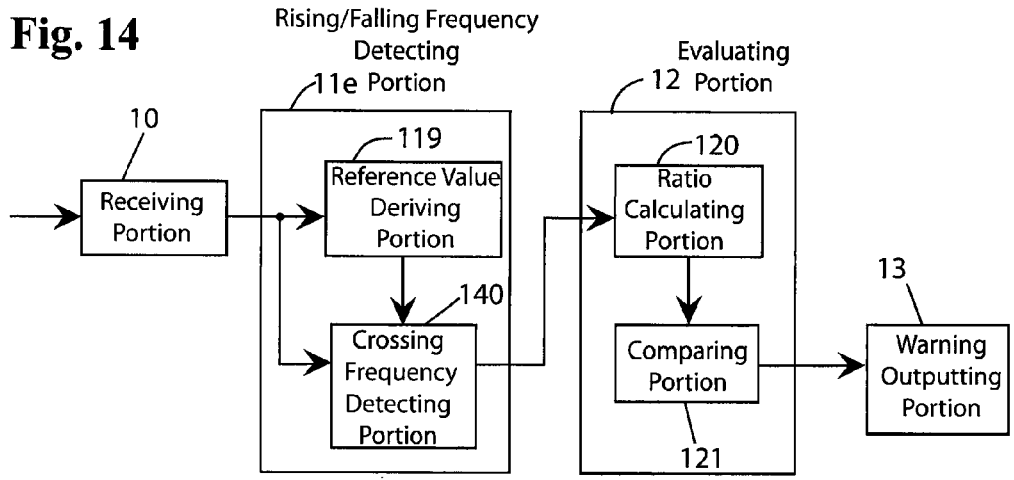
FIG. 14 is a block diagram illustrating the structure of a pressure guiding tube blockage diagnosing device according to an example.

While in this example an average value or central value was used as the reference value for the differential pressure value P, instead the first differential pressure value P in the applicable detecting interval may be used as the reference value. FIG. 14 is a block diagram illustrating the structure of a pressure guiding tube blockage diagnosing device according to an example of the present invention, where structures identical to those in FIG. 2 are assigned identical codes. The blockage diagnosing device according to the present example is structured from: a receiving portion 10; a rising/falling frequency detecting portion 11e; evaluating portion 12; and a warning outputting portion 13. The rising/filling frequency detecting portion 11e comprises a reference value deriving portion 119 and a crossing frequency detecting portion 140.

The reference value deriving portion 119 of the rising/falling frequency detecting portion 11e segments the time series of the differential pressure values P into a plurality of continuous intervals, and uses as the reference value for each interval the first differential pressure value P of that interval. Following this, the crossing frequency detecting portion 140 of the rising/falling frequency detecting portion 11 counts, for each interval, the number of times that the reference value of that interval is crossed by the differential pressure value P during the applicable detection interval. The crossing frequency is the differential pressure fluctuation rising/falling frequency. The operation of the evaluating portion 112 and the warning outputting portion 113 are identical to those above.

In the present example, the point wherein the number of crossings can be counted in real time is identical to the above examples; however, the amount of calculation is reduced and the implementation is easier to the extent that the calculations of the average value or central value are not necessary. Because the first differential pressure value is used as the reference value for the applicable detecting interval, rather than the average value or central value, the calculations within an interval are somewhat less precise. However, if a sufficiently large number of intervals is taken and an average value for the number of crossings in each interval is calculated, and the average value for the number of crossings is applied to the evaluating portion 12, then significant diagnosing results can be obtained. However, if the average value of the numbers of crossings in a plurality of intervals is used, then the time required for the diagnosis is elongated.

Note that while in the above examples the rising/falling frequencies for the fluctuation were calculated as ratios, divided by the number of samples in a single interval, and the ratios were compared against threshold values, there is no limitation thereto, and, of course, the rising/falling frequencies themselves may be compared directly to threshold values.

Figure 15:
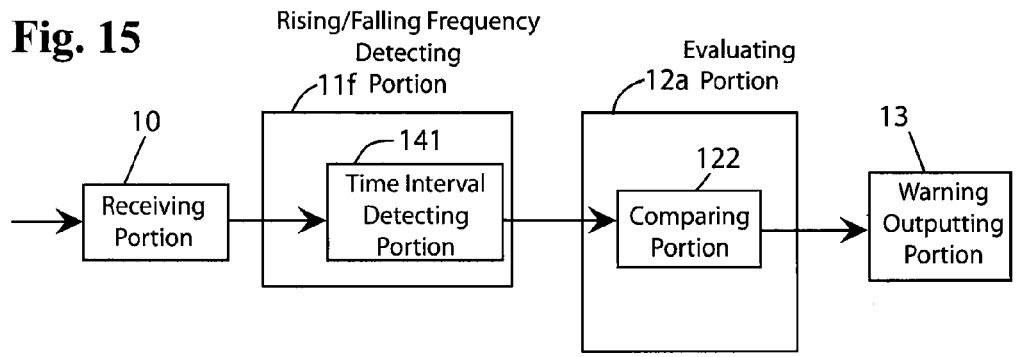
FIG. 15 is a block diagram illustrating the structure of a pressure guiding tube blockage diagnosing device according to another example.

A further example according to the present invention is explained next. FIG. 15 is a block diagram illustrating the structure of a pressure guiding tube blockage diagnosing device according to an above example, where structures identical to those in FIG. 2 are assigned identical codes. The blockage diagnosing device according to the present example is structured from: a receiving portion 10; a rising/falling frequency detecting portion 11*f*; an evaluating portion 12*a*; and a warning outputting portion 13.

In the present example, the time intervals between the maximum value and the minimum value of the differential pressure values P are detected as the information corresponding to the rising/falling frequency of the fluctuation of the differential pressure. The rising/falling frequency detecting portion 11*f* includes a time interval detecting portion 141. The evaluating portion 12*a* has a comparing portion 122.

The time interval detecting portion 141 segments the time series of the differential pressure values P into a plurality of continuous intervals, and calculates, for each interval, the time interval between the maximum value and the minimum value of the differential pressure values P. As is clear from the example in FIG. 3, a plurality of maximum values and minimum values for the differential pressure values P appear within a single interval, and thus a plurality of time intervals are also detected in a single interval. Consequently, the time intervals actually calculated by the time interval detecting portion 141 are average values of pluralities of time intervals.

The comparing portion 122 of the evaluating portion 12*a* compares the time interval calculated by the time interval detecting portion 141 to two threshold values that have been established in advance. Given the inversely-proportional relationship between the time interval and the rising/falling frequency, in the present example the larger threshold value shall be termed "threshold value A," and the smaller threshold value shall be termed "threshold value B," which is the opposite of the case in the above example. When the time interval is continuously above the threshold value A, the comparing portion 122 determines that a blockage has occurred in the pressure guiding tube 3 and/or the pressure guiding tube 4. Specifically, when the time interval is greater than the threshold value A a specific number of times in a row, or if the average value for the time interval for a specific number of intervals is greater than the threshold value A, then the comparing portion 122 may determine that a blockage has occurred in the pressure guiding tube 3 and/or the pressure guiding tube 4.

Furthermore, when the time interval is continuously below the threshold value B, the comparing portion 122 determines that a blockage has occurred in the pressure guiding tube 3 or the pressure guiding tube 4. Specifically, when the time interval is less than the threshold value B a specific number of times in a row, or if the average value for the time interval for a specific number of intervals is less than the threshold value B, then the comparing portion 122 may determine that a blockage has occurred in the pressure guiding tube 3 or the pressure guiding tube 4. The operation of the warning outputting portion 13 is identical to those above, identical effects as above can be obtained through the present example.

Note that in the above examples, at least the rising/falling frequency detecting portions 11, 11*a*, 11*b*, 11*c*, 11*d*, 11*e*, and 11*f*, and the evaluating portions 12 and 2*a* may be achieved through a program that controls a computer that is provided with a CPU, a memory, and an interface, and controls the hardware resources thereof. The CPU executes the processes explained in the above examples in accordance with a program that is stored in memory.

The present invention can be applied to technologies for diagnosing the state of blockage of pressure guiding tubes.

The invention claimed is:

1. A pressure guiding tube blockage diagnosing device comprising:
   a differential pressure detector detecting, through two pressure guiding tubes, a differential pressure that is produced when that which is to be measured, having a fluctuation in a pressure, passes through a differential pressure generating mechanism;
   a fluctuation speed detector detecting a speed of a fluctuation in the pressure, based on a differential pressure value detected by the differential pressure detector; and
   an evaluating device evaluating a state of blockage of a pressure guiding tube based on the speed of fluctuation.

2. The pressure guiding tube blockage diagnosing device as set forth in claim 1, wherein the fluctuation speed detector is provided with a rising/falling frequency detector segmenting a time series of the differential pressure values detected by the differential pressure detector into a plurality of intervals and detecting, for each interval, the rising/falling frequency of the fluctuation of the differential pressure, or data corresponding to the rising/falling movement frequency, as information indicating the speed of the fluctuation,
   wherein the evaluating device comprises a comparing device evaluating the state of blockage of the pressure guiding tubes through comparing, to a specific threshold value, the rising/falling frequency of the fluctuation or data corresponding to the rising/falling frequency.

3. The pressure guiding tube blockage diagnosing device as set forth in claim 2, wherein the rising/falling frequency detector comprises:
   a reference value calculator calculating, for each interval, a reference value for the differential pressure detected by the differential pressure detector; and
   a crossing frequency counter counting, as the rising/falling frequency for each interval, the number of times during the applicable detecting interval that the differential pressure crosses the reference value calculated during the immediately preceding interval.

4. The pressure guiding tube blockage diagnosing device as set forth in claim 2, wherein the rising/falling frequency detector comprises:
  a reference value calculator calculating, for each interval, a reference value for the differential pressure detected by the differential pressure detector; and
  a crossing frequency counter counting, as the rising/falling frequency for each interval, the number of times during the applicable detecting interval that the differential pressure crosses the reference value calculated during the same interval.

5. The pressure guiding tube blockage diagnosing device as set forth in claim 3, wherein the reference value is an average value or central value of the differential pressure value.

6. The pressure guiding tube blockage diagnosing device as set forth in claim 2, wherein the rising/falling frequency detector comprises:
  a difference value detector detecting a difference value between the differential pressure value detected by the differential pressure detector and a differential pressure value of a specific time interval earlier; and
  a crossing frequency detector counting, as the rising/falling frequency for each interval, the number of times during the applicable detecting interval that the difference value crosses zero.

7. The pressure guiding tube blockage diagnosing device as set forth in claim 2, wherein the rising/falling frequency detector comprises a maximum value/minimum value detector counting, as the rising/falling frequency of each interval, the number of maximum values and minimum values of the differential pressure values detected by the differential pressure detector.

8. The pressure guiding tube blockage diagnosing device as set forth in claim 2, wherein the rising/falling frequency detector comprises:
  a moving average value calculator calculating a moving average value of the differential pressure values detected by the differential pressure detector; and
  a crossing frequency detector counting, as the rising/falling frequency for each interval, the number of times during the applicable detecting interval that the differential pressure value crosses the moving average value.

9. The pressure guiding tube blockage diagnosing device as set forth in claim 2, wherein the rising/falling frequency detector comprises:
  a rate-of-change limit processor performing a rate-of-change limit process on the differential pressure value detected by the differential pressure detector;
  a second-order delay processor performing two-stage delay processing on the differential pressure values after the rate-of-change limit processing; and
  a crossing frequency detector counting, as the rising/falling frequency during each interval, the number of times during the applicable detecting interval that the differential pressure value crosses the output value of the second-order processing means.

10. The pressure guiding tube blockage diagnosing device as set forth in claim 2, wherein the rising/falling frequency detector comprises:
  a trend line calculator calculating a trend line of the differential pressure values detected by the differential pressure detector; and
  a crossing frequency detector counting, as the rising/falling frequency for each interval, the number of times during the applicable detecting interval that the differential pressure value crosses the trendline.

11. The pressure guiding tube blockage diagnosing device as set forth in claim 2, wherein the rising/falling frequency detector comprises:
  a reference value deriving device using, as the reference value in each interval, the minimum differential pressure value for each interval; and
  a crossing frequency detector counting, as the rising/falling frequency for each interval, the number of times in the applicable detecting interval that the differential pressure value crosses the reference value.

12. The pressure guiding tube blockage diagnosing device as set forth in claim 3, wherein the comparing device evaluates that a blockage has occurred in one or both of two pressure guiding tubes when the rising/falling frequency for the fluctuation continuously falls below a threshold value that is the smaller of two aforementioned threshold values, and evaluates that a blockage has occurred in one of the two pressure guiding tubes when the rising/falling frequency of the fluctuation is continuously above the larger of the threshold values.

13. The pressure guiding tube blockage diagnosing device as set forth in claim 3, wherein: the evaluating device comprises:
  a ratio calculator calculating, for each individual interval, the ratio of the rising/falling frequency of the fluctuation divided by the number of samples in the interval,
  wherein the comparing device, rather than comparing the rising/falling frequency of the fluctuation to the threshold value, compares the ratio to the threshold value, and evaluate that a blockage has occurred in at least one of the two pressure guiding tubes if the ratio is continuously below the smaller threshold value of the two threshold values, and evaluates that a blockage has occurred in one of the two pressure guiding tubes if the ratio is continuously above the larger of the threshold values.

14. The pressure guiding tube blockage diagnosing device as set forth in claim 2, wherein the rising/falling frequency detector is provided with a time interval detector detecting, as information corresponding to the rising/falling frequency of each interval, the time intervals between maximum values and minimum values of the differential pressure values detected by the differential pressure detector.

15. The pressure guiding tube blockage diagnosing device as set forth in claim 14, wherein the comparing device evaluate that a blockage has occurred in at least one of the two pressure guiding tubes when the time intervals are continuously greater than the larger threshold value of the two threshold values, and evaluates that a blockage has occurred in one of the two pressure guiding tubes when the time intervals are continuously less than the smaller threshold value.

16. A pressure guiding tube blockage diagnosing method comprising the steps of:
  detecting, through two pressure guiding tubes, a differential pressure that is produced when that which is to be measured, having a fluctuation in a pressure, passes through a differential pressure generating mechanism;
  detecting a speed of a fluctuation in the pressure, based on the detected pressure value; and
  evaluating a state of blockage of a pressure guiding tube based on the speed of fluctuation.

17. The pressure guiding tube blockage diagnosing method as set forth in claim 16, wherein the fluctuation speed detecting step comprises the steps of:
  segmenting a time series of the differential pressure values detected by the differential pressure detecting step into a plurality of intervals; and detecting, for each interval, the rising/falling frequency of the fluctuation of the differential pressure, or data corresponding to the rising/falling movement frequency, as information indicating the speed of the fluctuation;

wherein the evaluating step comprises the step of evaluating the state of blockage of the pressure guiding tubes through comparing, to a specific threshold value, the rising/falling frequency of the fluctuation or data corresponding to the rising/falling frequency.

\* \* \* \* \*